US011454227B2

(12) United States Patent
Hayama et al.

(10) Patent No.: US 11,454,227 B2
(45) Date of Patent: Sep. 27, 2022

(54) CAPACITY CONTROL VALVE

(71) Applicant: EAGLE INDUSTRY CO., LTD., Tokyo (JP)

(72) Inventors: Masahiro Hayama, Tokyo (JP); Yoshihiro Ogawa, Tokyo (JP); Keigo Shirafuji, Tokyo (JP); Kohei Fukudome, Tokyo (JP); Takahiro Ejima, Tokyo (JP); Daichi Kurihara, Tokyo (JP); Wataru Takahashi, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 16/961,627

(22) PCT Filed: Jan. 21, 2019

(86) PCT No.: PCT/JP2019/001570
§ 371 (c)(1),
(2) Date: Jul. 10, 2020

(87) PCT Pub. No.: WO2019/142931
PCT Pub. Date: Jul. 25, 2019

(65) Prior Publication Data
US 2020/0355175 A1 Nov. 12, 2020

(30) Foreign Application Priority Data
Jan. 22, 2018 (JP) .............................. JP2018-008486

(51) Int. Cl.
F04B 27/18 (2006.01)
F16K 31/06 (2006.01)

(52) U.S. Cl.
CPC ...... *F04B 27/1804* (2013.01); *F16K 31/0624* (2013.01); *F04B 2027/185* (2013.01);
(Continued)

(58) Field of Classification Search
CPC .......... F04B 27/1804; F04B 2027/1827; F04B 2027/1831; F04B 2027/185; F04B 2027/1859; F16K 31/0624; F16K 31/0603
See application file for complete search history.

(56) References Cited

U.S. PATENT DOCUMENTS

| 1,614,002 A | 1/1927 | Horton | A62C 35/605 |
| 2,267,515 A | 12/1941 | Wilcox | F16K 31/0627 |

(Continued)

FOREIGN PATENT DOCUMENTS

| CN | 111279076 | 6/2020 | F04B 27/18 |
| CN | 111316028 | 6/2020 | F16K 31/06 |

(Continued)

OTHER PUBLICATIONS

International Search Report (ISR) dated Apr. 16, 2019, issued for International application No. PCT/JP2019/001570. (2 pages).

(Continued)

*Primary Examiner* — Devon C Kramer
*Assistant Examiner* — Joseph S. Herrmann
(74) *Attorney, Agent, or Firm* — Hayes Soloway P.C.

(57) ABSTRACT

A capacity control valve (1) includes a valve main body (10) having a first communication passage (11), a second communication passage (12), a third communication passage (13), and a main valve seat (15a), a pressure-sensitive body (24), a valve element (20) having an intermediate communication passage (29), a main valve portion (21c), and a restrictor portion (25), and a solenoid (30) that drives a rod (36). The rod (36) is relatively moved with respect to the valve element (20) so as to control an opening degree of the restrictor portion (25). The capacity control valve is capable of efficiently discharging a liquid coolant irrespective of pressure of a suction chamber and improving control stability.

4 Claims, 6 Drawing Sheets

(52) U.S. Cl.
    CPC .............. *F04B 2027/1827* (2013.01); *F04B 2027/1831* (2013.01); *F04B 2027/1859* (2013.01)

(56) References Cited

U.S. PATENT DOCUMENTS

| | | | | |
|---|---|---|---|---|
| 3,360,304 | A | 12/1967 | Adams | B61K 7/12 |
| 3,483,888 | A | 12/1969 | Hugo | F16K 15/046 |
| 4,364,615 | A | 12/1982 | Euler | F16C 27/04 |
| 4,579,145 | A | 4/1986 | Leiber | F16H 61/0251 |
| 4,615,358 | A | 10/1986 | Hammond | F15B 13/0402 |
| 4,895,192 | A | 1/1990 | Mortenson | F01M 11/04 |
| 4,917,150 | A | 4/1990 | Koch | F16K 31/0606 |
| 4,979,542 | A | 12/1990 | Mesenich | F02M 47/027 |
| 4,998,559 | A | 3/1991 | McAuliffe | F16H 61/0251 |
| 5,060,695 | A | 10/1991 | McCabe | G05D 16/2024 |
| 5,217,047 | A | 6/1993 | McCabe | F16H 16/0251 |
| 5,263,694 | A | 11/1993 | Smith | B60G 15/068 |
| 5,702,235 | A | 12/1997 | Hirota | F04B 27/1804 |
| 5,778,932 | A | 7/1998 | Alexander | G05D 16/2024 |
| 6,010,312 | A | 1/2000 | Suitou | F04B 27/1804 |
| 6,161,585 | A | 12/2000 | Kolchinsky | F05D 16/2024 |
| 6,361,283 | B1 | 3/2002 | Ota | F04B 27/1804 |
| 6,481,976 | B2 | 11/2002 | Kimura | F04B 27/1804 |
| 7,533,687 | B2 | 5/2009 | Uemura | F16K 27/048 |
| 8,021,124 | B2 | 9/2011 | Umemura | F04B 27/1804 |
| 8,079,827 | B2 | 12/2011 | Iwa | F04B 27/1804 |
| 8,225,818 | B1 | 7/2012 | Stephens | F15B 13/0442 |
| 8,651,826 | B2 | 2/2014 | Futakuchi | F04B 27/1804 |
| 9,022,346 | B2 | 5/2015 | Najmolhoda | F16K 31/0613 |
| 9,027,598 | B2 | 5/2015 | Schneider | F16K 31/0613 |
| 9,132,714 | B2 | 9/2015 | Futakuchi | F04B 27/1804 |
| 9,297,373 | B2 | 3/2016 | Bagagli | F16K 15/026 |
| 9,400,027 | B2 | 7/2016 | Imaizumi | F16F 1/32 |
| 9,453,518 | B2 | 9/2016 | Schulz | F15B 13/043 |
| 9,581,149 | B2 | 2/2017 | Ota et al. | F04B 27/1804 |
| 9,581,150 | B2 | 2/2017 | Ota et al. | F04B 27/1804 |
| 9,732,874 | B2 * | 8/2017 | Saeki | F04B 27/1804 |
| 9,874,286 | B2 | 1/2018 | Bagagli | F16K 15/12 |
| 10,113,539 | B2 | 10/2018 | Sugamura | F04B 27/1804 |
| 10,519,944 | B2 | 12/2019 | Taguchi | F04B 27/1804 |
| 10,557,463 | B2 | 2/2020 | Sugamura | F04B 27/1804 |
| 10,690,125 | B2 | 6/2020 | Hayama | F04B 27/18 |
| 10,784,804 | B2 | 9/2020 | Sasaki | H02P 25/022 |
| 10,837,431 | B2 | 11/2020 | Tonegawa | F04B 49/22 |
| 2001/0003573 | A1 | 6/2001 | Kimura et al. | 417/222.2 |
| 2002/0134444 | A1 | 9/2002 | Isobe | F16K 27/041 |
| 2003/0145615 | A1 | 8/2003 | Sasaki | F16K 31/0637 |
| 2003/0202885 | A1 | 10/2003 | Taguchi | F04B 49/00 |
| 2004/0045305 | A1 | 3/2004 | Murase | F25B 49/022 |
| 2004/0165994 | A1 | 8/2004 | Umemura | F04B 27/1804 |
| 2005/0076959 | A1 | 4/2005 | Yamamoto | F16K 31/0624 |
| 2005/0151310 | A1 | 7/2005 | Rodeffer | F16F 1/32 |
| 2007/0214814 | A1 | 9/2007 | Umemura et al. | |
| 2007/0264134 | A1 | 11/2007 | Hirota | F04B 27/1804 |
| 2008/0138213 | A1 | 6/2008 | Umemura et al. | 417/222.2 |
| 2008/0175727 | A1 | 7/2008 | Umemura et al. | F04B 49/22 |
| 2009/0108221 | A1 | 4/2009 | Umemura et al. | 251/129.15 |
| 2009/0114871 | A1 | 5/2009 | Iwa | F04B 27/14 |
| 2009/0183786 | A1 | 7/2009 | Iwa et al. | |
| 2009/0256091 | A1 | 10/2009 | Nordstrom | F16K 31/0613 |
| 2010/0282991 | A1 | 11/2010 | Okamoto | F16K 31/02 |
| 2011/0061749 | A1 | 3/2011 | Okamoto | F16K 31/0655 |
| 2011/0089352 | A1 | 4/2011 | Morgan | F16K 11/0716 |
| 2012/0056113 | A1 | 3/2012 | Tano | F04B 27/1804 |
| 2012/0198992 | A1 | 8/2012 | Futakuchi et al. | 91/505 |
| 2012/0198993 | A1 | 8/2012 | Fukudome | 91/505 |
| 2012/0211686 | A1 | 8/2012 | Okamoto | F16K 31/0655 |
| 2013/0291963 | A1 | 11/2013 | Futakuchi et al. | 137/487.5 |
| 2014/0099214 | A1 | 4/2014 | Fukudome | 417/222.2 |
| 2014/0130916 | A1 | 5/2014 | Saeki | F16K 31/0613 |
| 2014/0294632 | A1 | 10/2014 | Kondo et al. | 417/434 |
| 2014/0369862 | A1 | 12/2014 | Ota et al. | F04B 27/1804 |
| 2015/0021131 | A1 | 1/2015 | Wootten | F16F 9/348 |
| 2015/0027573 | A1 | 1/2015 | Ochiai | F15B 13/0402 |
| 2015/0044067 | A1 | 2/2015 | Ota et al. | F04B 27/1804 |
| 2015/0068628 | A1 | 3/2015 | Iwa | 137/625.65 |
| 2015/0104334 | A1 | 4/2015 | Ota et al. | F04B 27/1804 |
| 2015/0275874 | A1 | 10/2015 | Ota | F04B 27/1804 |
| 2015/0345655 | A1 * | 12/2015 | Higashidozono | F04B 27/1804 137/624.27 |
| 2016/0053755 | A1 | 2/2016 | Taguchi | F04B 49/22 |
| 2016/0290326 | A1 * | 10/2016 | Sugamura | F04B 27/1804 |
| 2017/0284562 | A1 | 10/2017 | Hayama | F16K 41/00 |
| 2018/0156345 | A1 | 6/2018 | Kanda | F15B 13/0431 |
| 2018/0187793 | A1 | 7/2018 | Futakuchi | F04B 39/08 |
| 2018/0291888 | A1 | 10/2018 | Tonegawa et al. | F04B 49/22 |
| 2019/0162175 | A1 | 5/2019 | Higashidozono | F04B 27/18 |
| 2020/0032781 | A1 | 1/2020 | Higashidozono | F16K 31/0624 |
| 2020/0309105 | A1 | 10/2020 | Hayama et al. | F04B 27/18 |
| 2020/0318624 | A1 | 10/2020 | Hayama | F04B 27/18 |
| 2020/0332786 | A1 * | 10/2020 | Hayama | F04B 27/1804 |
| 2020/0362974 | A1 | 11/2020 | Hayama et al. | F16K 11/24 |
| 2020/0370545 | A1 | 11/2020 | Hayama et al. | F04B 27/18 |
| 2021/0372396 | A1 | 12/2021 | Kurihara | G05D 7/0635 |

FOREIGN PATENT DOCUMENTS

| | | | |
|---|---|---|---|
| CN | 111417780 | 7/2020 | ............. F04B 27/18 |
| EP | 2594794 | 5/2013 | ............. F04B 27/18 |
| EP | 3726054 | 10/2020 | ............. F04B 27/18 |
| JP | 6-26454 | 2/1994 | ............. F04B 27/08 |
| JP | 2001165055 | 6/2001 | ............. F04B 27/14 |
| JP | 2004003468 | 1/2004 | ............. F04B 27/14 |
| JP | 2005307817 | 11/2005 | ............. F04B 27/14 |
| JP | 2007247512 | 9/2007 | ............. F04B 27/14 |
| JP | 2008157031 | 7/2008 | ............. F04B 27/14 |
| JP | 2009275550 | 11/2009 | ............. F04B 49/00 |
| JP | 2012144986 | 8/2012 | ............. F04B 27/14 |
| JP | 2012211579 | 11/2012 | ............. F04B 27/14 |
| JP | 5167121 B2 | 3/2013 | |
| JP | 2014080927 A | 5/2014 | |
| JP | 2014092207 A | 5/2014 | |
| JP | 2014095463 A | 5/2014 | |
| JP | 2014194180 | 10/2014 | ............. F04B 27/14 |
| JP | 201575054 | 4/2015 | ............. F04B 27/14 |
| JP | 20151168 | 5/2015 | ............. F04B 27/14 |
| JP | 2015137546 | 7/2015 | ............. F04B 27/14 |
| JP | 2015178795 A | 10/2015 | |
| JP | 5983539 | 8/2016 | ............. F04B 27/18 |
| JP | 2016196825 A | 11/2016 | |
| JP | 2016196876 | 11/2016 | ............. F04B 27/18 |
| JP | 2016205404 | 12/2016 | ............. F04B 27/18 |
| JP | 6135521 | 5/2017 | ............. F04B 27/18 |
| JP | 2017089832 A | 5/2017 | |
| JP | 2018179087 | 11/2018 | ............. F16B 31/06 |
| WO | WO2006090760 | 8/2006 | ............. F04B 27/18 |
| WO | WO2007119380 | 10/2007 | ............. F04B 27/14 |
| WO | WO2009025298 | 2/2009 | ............. F16K 31/06 |
| WO | WO2011114841 | 9/2011 | ............. F04B 27/14 |
| WO | WO2012077439 | 6/2012 | ............. F04B 27/14 |
| WO | WO2014119594 | 8/2014 | ............. F04B 27/14 |
| WO | WO2014148367 | 9/2014 | ............. F16K 31/06 |

OTHER PUBLICATIONS

Official Action issued in related U.S. Appl. No. 16/957,344, dated Mar. 29, 2022 (19 pgs).
U.S. Appl. No. 16/763,800, filed May 13, 2020, Hiyama et al.
The First Office Action issued in Chinese Patent Appln. Serial No. 201880081296.0, dated Jul. 5, 2021, with English translation, 9 pages.
Extended European Search Report issued in European Patent Appln. Serial No. 18896700.4, dated Aug. 12, 2021, 8 pages.
European Official Action issued in related European Patent Application Serial No. 18885296.6, dated Jan. 21, 2022, 4 pages.
International Preliminary Report on Patentability issued in PCT/JP2018/047716, dated Jun. 30, 2020, 8 pages.
International Search Report and Written Opinion issued in PCT/JP2018/047716, dated Mar. 26, 2019, with English translation, 14 pages.

(56) References Cited

OTHER PUBLICATIONS

International Preliminary Report on Patentability issued in PCT/JP2014/051901, dated Aug. 13, 2015, 7 pages.
International Search Report issued in PCT/JP2014/051901, dated Apr. 18, 2014, 4 pages.
International Preliminary Report on Patentability, International Search Report and Written Opinion issued in PCT/JP2019/045731, dated Feb. 4, 2020, 21 pages.
International Search Report issued in PCT/JP2018/004500, dated May 15, 2018, 12 pages.
International Preliminary Report on Patentability issued in PCT/JP2018/004500, dated Aug. 20, 2019, 4pages.
International Search Report issued in PCT/JP2018/041768, dated Jan. 22, 2019, 12 pages.
International Preliminary Report on Patentability issued in PCT/JP2018/041768, dated May 19, 2020, 6 pages.
International Search Report issued in PCT/JP2018/002084, dated Apr. 17, 2018, 11 pages.
International Preliminary Report on Patentability issued in PCT/JP2018/002084, dated Jul. 30, 2019, 4 pages.
International Search Report issued in PCT/JP2018/047693, dated Mar. 19, 2019, 11 pages.
International Preliminary Report on Patentability issued in PCT/JP2018/047693, dated Jun. 30, 2020, 4 pages.
International Search Report issued in PCT/JP2018/047694, dated Mar. 19, 2019, 20 pages.
International Preliminary Report on Patentability issued in PCT/JP2018/047694, dated Jun. 30, 2020, 7 pages.
International Search Report issued in PCT/JP2018/045010, dated Feb. 26, 2019, 11 pages.
International Preliminary Report on Patentability issued in PCT/JP2018/045010, dated Jun. 9, 2020, 4 pages.
International Search Report issued in PCT/JP2019/001569, dated Apr. 16, 2019, 20 pages.
International Preliminary Report on Patentability issued in PCT/JP2018/001569, dated Oct. 15, 2018, 7pages.
International Search Report and Written Opinion with translation issued in PCT/JP2018/043652, dated Feb. 19, 2019 (21 pages).
International Preliminary Report on Patentability with translation issued in PCT/JP2018/043652, dated Jun. 2, 2020 (7 pages).
Official Action issued in related U.S. Appl. No. 16/957,340, dated Feb. 4, 2022 (18 pgs).
Official Action issued in related U.S. Appl. No. 16/957,340, dated Sep. 20, 2021 (18 pgs).
Notice of Allowance issued in related U.S. Appl. No. 16/961,620, dated Feb. 9, 2022 (6 pgs).
Notice of Allowance issued in related U.S. Appl. No. 16/772,703, dated Oct. 13, 2021 (5 pgs).
Official Action issued in related U.S. Appl. No. 16/772,703, dated Jul. 21, 2021 (6 pgs).
Official Action issued in related U.S. Appl. No. 16/961,620, dated Aug. 5, 2021 (7 pgs).
Official Action issued in related U.S. Appl. No. 17/293,435, dated Nov. 23, 2021 (12 pgs).
Official Action issued in related U.S. Appl. No. 16/961,627, dated Oct. 26, 2021 (24 pgs).
Official Action issued in related U.S. Appl. No. 16/766,124, dated Oct. 27, 2021 (11 pgs).
Notice of Allowance issued in related U.S. Appl. No. 16/766,124, dated Apr. 4, 2022 (5 pgs).
U.S. Appl. No. 16/480,281, filed Jul. 23, 2019, Higashidozono et al.
U.S. Appl. No. 16/483,621, filed Aug. 5, 2019, Higashidozono et al.
U.S. Appl. No. 16/763,800, filed May 13, 2020, Hayama et al.
U.S. Appl. No. 16/766,096, filed May 21, 2020, Kurihara et al.
U.S. Appl. No. 16/957,340, filed Jun. 23, 2020, Hayama et al.
U.S. Appl. No. 16/957,344, filed Jun. 23, 2020, Hayama et al.
U.S. Appl. No. 16/961,620, filed Jul. 10, 2020, Hayama et al.
U.S. Appl. No. 17/293,435, filed May 12, 2021, Hayama et al.
U.S. Appl. No. 16/772,703, filed Jun. 12, 2020, Hayama et al.
U.S. Appl. No. 14/431,270, filed Mar. 25, 2015, Higashidozono et al.
European Official Action issued in European Patent Application Serial No. 18897846.4, dated Apr. 14, 2022 (5 pgs).
European Official Action issued in related European Patent Application Serial No. 19890548.1, dated May 24, 2022 (6 pgs).
European Official Action issued in related European Patent Application Serial No. 18884020.1, dated Jun. 28, 2022 (4 pgs).
Korean Official Action issued in related Korean Patent Application No. 10-2020-7013914, dated Mar. 15, 2022 (5 pgs).
Chinese Office Action issued in Chinese Patent Appln. Serial No, 201880080867.9, dated Mar. 16, 2022, with English translation, 13 pages.
Chinese Office Action issued in Chinese Patent Appln. Serial No, 201880072030.X, dated Jun. 6, 2022, with English translation, 12 pages.
Japanese Office Action issued in Japanese Patent Appln. Serial No. 2019-562060, dated May 10, 2022, with English translation, 8 pages.
Japanese Office Action issued in Japanese Patent Appln. Serial No. 2019-562061, dated May 10, 2022, with English translation, 10 pages.
International Search Report arid Written Opinion with translation issued in PCT/JP2019/001570, dated Jul. 2, 2019 (19 pages).
International Preliminary Report on Patentability with translation issued in PCT/2019/001570, dated Jul. 28, 2020 (6 pages).
International Search Report and Written Opinion with translation issued in PCT/JP2018/045782, dated Feb. 26, 2019 (11 pages).
International Preliminary Report on Patentability with translation issued in PCT/JP2018/045782, dated Jun. 16, 2020 (4 pages).
Official Action issued in related U.S. Appl. No. 17/293,435, dated May 31, 2022 (11 pgs).
Notice of Allowance issued in related U.S. Appl. No. 16/957,340, dated May 24, 2022 (16 pgs).
Notice of Allowance issued in related U.S. Appl. No. 16/961,627, dated May 5, 2022 (19 pgs).
Official Action issued in related U.S. Appl. No. 16/763,800, dated Jun. 8, 2022 (9 pgs).
Official Action issued in related U.S. Appl. No. 161480,281, dated Jun. 8. 2022 (15 pgs).
Official Action issued in related U.S. Appl. No. 16/766,096, dated May 27, 2022 (7 pgs).
Official Action issued in related U.S. Appl. No. 16/771,548, dated Dec. 8, 2021 (15 pgs).
Official Action issued in related U.S. Appl. No. 16/771,548, dated Jun. 7, 2022 (11 pgs).
Official Action issued in related U.S. Appl. No. 16/483,621, dated Jun. 17, 2022 (13 pgs).

* cited by examiner

CAPACITY CONTROL VALVE

CROSS-REFERENCE TO RELATED APPLICATIONS

This application is the U.S. National Phase under 35 U.S.C. § 371 of International Application PCT/JP2019/001570, filed Jan. 21, 2019, which claims priority to Japanese Patent Application No. JP2018-008486, filed Jan. 22, 2018. The International Application was published under PCT Article 21(2) in a language other than English.

TECHNICAL FIELD

The present invention relates to a capacity control valve used for controlling a flow rate or pressure of a variable capacity compressor.

BACKGROUND ART

As the variable capacity compressor, for example, a swash plate type variable capacity compressor used in an air conditioning system of an automobile, etc. includes a rotation shaft to be driven and rotated by rotation force of an engine, a swash plate coupled to the rotation shaft so that a tilting angle is variable, and compressing pistons coupled to the swash plate, etc., and is to change strokes of the pistons and control a discharge amount of a coolant by changing the tilting angle of the swash plate.

This tilting angle of the swash plate can be continuously changed by appropriately controlling pressure in a control chamber by using a capacity control valve to be driven and opened/closed by electromagnetic force while utilizing suction pressure of a suction chamber to which the coolant is sucked in, discharge pressure of a discharge chamber from which the coolant pressurized by the pistons is discharged, and control chamber pressure of the control chamber (crank chamber) in which the swash plate is housed, and by adjusting a balance state of pressure acting on both surfaces of the pistons.

FIG. 5 shows an example of such a capacity control valve. A capacity control valve 160 includes a valve portion 170 having a second valve chamber 182 which communicates with the discharge chamber of the compressor via a second communication passage 173, a first valve chamber 183 which communicates with the suction chamber via a first communication passage 171, and a third valve chamber 184 which communicates with the control chamber via a third communication passage 174, a pressure-sensitive body 178 arranged in the third valve chamber, the pressure-sensitive body to be extended and contracted by peripheral pressure, the pressure-sensitive body having a valve seat body 180 provided in a free end in the extending and contracting direction, a valve element 181 having a second valve portion 176 which opens and closes a valve hole 177 providing communication between the second valve chamber 182 and the third valve chamber 184, a first valve portion 175 which opens and closes the first communication passage 171 and a distribution groove 172, and a third valve portion 179 which opens and closes the third valve chamber 184 and the distribution groove 172 by engagement with and disengagement from the valve seat body 180 in the third valve chamber 184, a solenoid portion 190 which applies electromagnetic drive force to the valve element 181, etc.

In this capacity control valve 160, without providing a clutch mechanism in the variable capacity compressor, in a case where the need for changing the control chamber pressure arises, the pressure (control chamber pressure) Pc in the control chamber and the suction pressure Ps (suction pressure) can be controlled by providing communication between the discharge chamber and the control chamber (hereinafter, referred to as the "conventional art". See Patent Document 1, for example).

CITATION LIST

Patent Documents

Patent Document 1: JP 5167121 P

SUMMARY OF THE INVENTION

Problem to be Solved by the Invention

In the conventional art, in a case where the swash plate type variable capacity compressor is stopped for a long time, a liquid coolant (made by cooling and liquefying a coolant during abandonment) is accumulated in the control chamber (crank chamber). Thus, even when the compressor is started up in this state, it is not possible to ensure a discharge amount as it is set. Therefore, in order to perform desired capacity control immediately after start-up, there is a need for discharging the liquid coolant of the control chamber (crank chamber) as soon as possible.

As shown in FIG. 6, the conventional capacity control valve 160 includes a function of discharging the liquid coolant in order to discharge the liquid coolant of the control chamber (crank chamber) as soon as possible at the time of start-up. That is, in a case where the variable capacity compressor is stopped and abandoned for a long time and then started up, the high-pressure liquid coolant accumulated in the control chamber (crank chamber) flows into the third valve chamber 184 from the third communication passage 174. Then, the pressure-sensitive body 178 is contracted, a part between the third valve portion 179 and the valve seat body 180 is opened, and from the third valve chamber 184 through the auxiliary communication passage 185, the communication passage 186, and the distribution groove 172, the liquid coolant is discharged to the discharge chamber from the control chamber (crank chamber) via the suction chamber and rapidly gasified, so that it is possible to make a cooling operation state for a short time.

However, in the above conventional art, at an initial stage of a liquid coolant discharging process, pressure of the control chamber is high and hence an opening degree of the third valve portion 179 is large. Thus, it is possible to efficiently discharge the liquid coolant. However, as discharge of the liquid coolant progresses and the pressure of the control chamber is lowered, the opening degree of the third valve portion 179 is decreased. Thus, there is a problem that it takes time to discharge the liquid coolant.

The capacity control valve 160 sets an opening degree of the second valve portion 176 to an opening degree determined in advance and controls so that the pressure and the discharge amount of the suction chamber of the variable capacity compressor have set values. However, the pressure of the control chamber (crank chamber) of the variable capacity compressor is gradually increased by a blow-by gas flowing through a tiny clearance between a piston and a cylinder bore. Thus, the pressure of the control chamber is not stabilized and there is sometimes a case where control stability of the capacity control valve 160 is deteriorated.

The present invention is achieved to solve the problems of the above conventional art, and an object of the present invention is to provide a capacity control valve capable of, in the capacity control valve that controls a flow rate or pressure of a variable capacity compressor in accordance with a valve opening degree of a valve portion, efficiently discharging a liquid coolant irrespective of pressure of a suction chamber, shifting to a cooling operation for a short time, and improving control stability.

Means for Solving Problem

In order to solve the foregoing problems, a capacity control valve according to a first aspect of the present invention is a capacity control valve that controls a flow rate or pressure of a variable capacity compressor in accordance with a valve opening degree of a valve portion, the capacity control valve being characterized by including a valve main body having a first communication passage through which a fluid of first pressure passes, a second communication passage arranged adjacent to the first communication passage, the second communication passage through which a fluid of second pressure passes, a third communication passage through which a fluid of third pressure passes, and a main valve seat arranged in a valve hole which provides communication between the second communication passage and the third communication passage, a pressure-sensitive body arranged in the valve main body on the third communication passage side, the pressure-sensitive body to be extended and contracted in accordance with peripheral pressure, a solenoid that drives a rod having a pressing portion that presses the pressure-sensitive body, a valve element having an intermediate communication passage providing communication between the first communication passage and the third communication passage, a main valve portion to be separated from and connected to the main valve seat so as to open and close the valve hole, and a restrictor portion opposing the pressing portion, the restrictor portion that narrows down the intermediate communication passage, and a first biasing member that biases the valve element in the valve closing direction of the main valve portion, characterized in that the rod is relatively moved with respect to the valve element so as to control an opening degree of the restrictor portion.

According to the first aspect, in coolant discharge, the rod maintains the opening degree of the restrictor portion in a fully opened state and it is possible to efficiently discharge a liquid coolant from the third communication passage to the first communication passage through the intermediate communication passage irrespective of pressure of a suction chamber.

The capacity control valve according to a second aspect of the present invention is characterized in that the restrictor portion has a communication passage that separates the pressing portion from the valve element and communicates with the intermediate communication passage.

According to the second aspect, a spacer separates the pressing portion from the valve element and by a communication passage of the spacer, the coolant is always discharged from the third communication passage to the first communication passage. Thus, it is possible to prevent pressure of a crank chamber from being increased by a blow-by gas so as to stabilize the pressure of the crank chamber. Thus, it is possible to improve stability of the capacity control valve.

The capacity control valve according to a third aspect of the present invention is characterized in that an opening area of the communication passage is smaller than an area of a clearance between the valve element and the pressing portion.

According to the third aspect, the communication passage serves as a bottleneck in the intermediate communication passage. Thus, by adjusting only the opening area of the communication passage, it is possible to adjust an amount of the coolant flowing from the third communication passage to the first communication passage.

The capacity control valve according to a fourth aspect of the present invention is characterized in that the first biasing member is arranged between the rod and the valve element.

According to the fourth aspect, it is possible to drive the valve element by the rod via the first biasing member.

The capacity control valve according to a fifth aspect of the present invention is characterized in that the solenoid further includes a plunger connected to the rod, a core arranged between the plunger and the valve main body, an electromagnetic coil, and a second biasing member arranged between the plunger and the core.

According to the fifth aspect, by the second biasing member arranged between the plunger and the core, the valve element is reliably biased in the valve opening direction of the main valve portion. Thus, it is possible to open the main valve portion when the solenoid is turned off.

The capacity control valve according to a sixth aspect of the present invention is characterized in that the first pressure is suction pressure of the variable capacity compressor, the second pressure is discharge pressure of the variable capacity compressor, and the third pressure is pressure of a crank chamber of the variable capacity compressor. The capacity control valve according to a seventh aspect of the present invention is characterized in that the first pressure is pressure of a crank chamber of the variable capacity compressor, the second pressure is discharge pressure of the variable capacity compressor, and the third pressure is suction pressure of the variable capacity compressor.

According to the sixth or seventh aspect, it is possible to respond to various variable capacity compressors.

DESCRIPTION OF EMBODIMENTS

Hereinafter, with reference to the drawings, a mode for carrying out the present invention will be described illustratively based on an embodiment. However, the dimensions, materials, shapes, relative positions, etc. of constituent parts described in this embodiment are not limited only to themselves unless otherwise described particularly explicitly.

Figure 1:
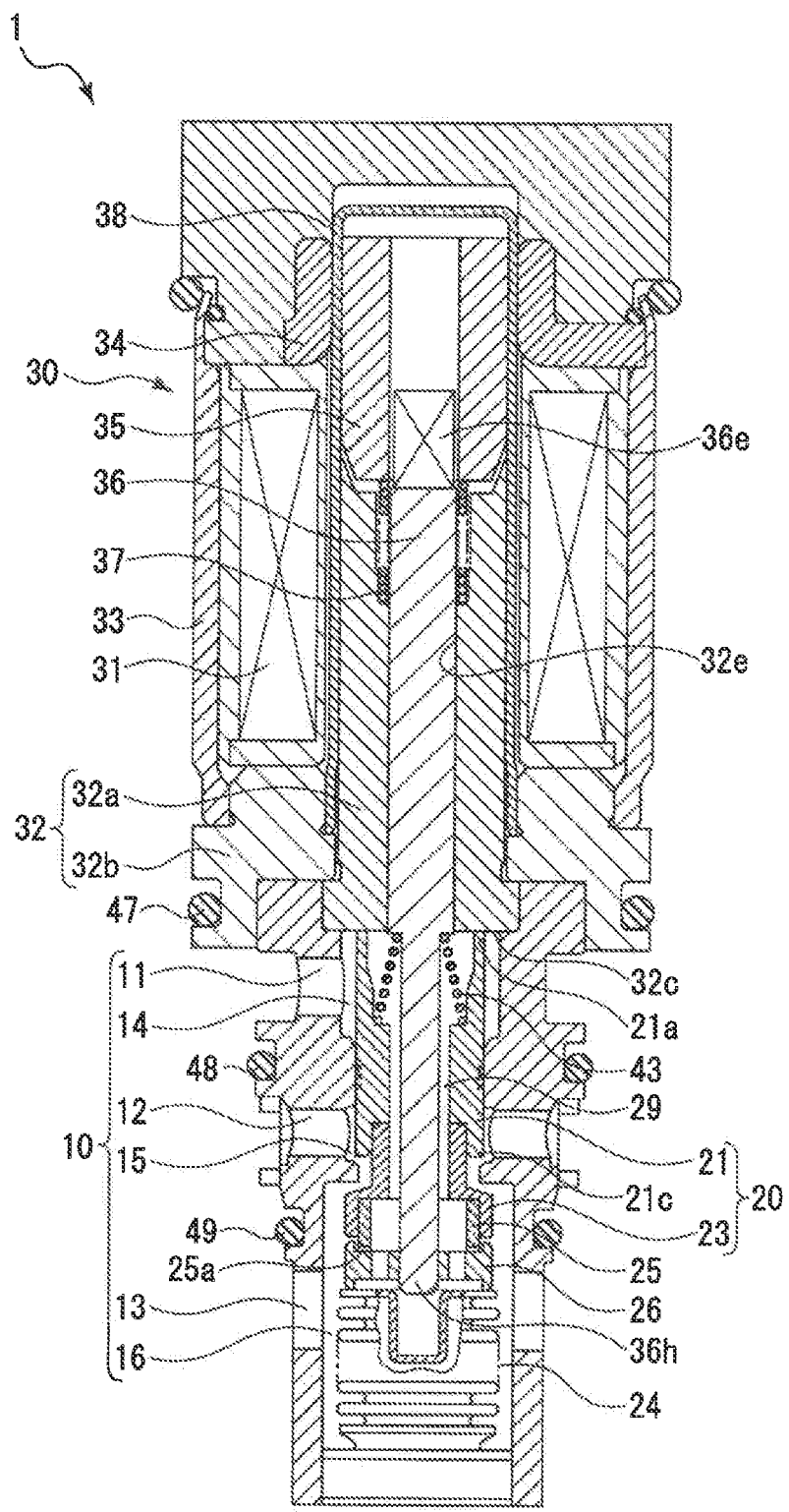
FIG. 1 is a front sectional view of a capacity control valve according to the present invention.

With reference to FIGS. 1 to 4, a capacity control valve according to the present invention will be described. In FIG. 1, the reference sign 1 denotes a capacity control valve. The capacity control valve 1 is mainly formed by a valve main body 10, a valve element 20, a pressure-sensitive body 24, and a solenoid 30.

Figure 2:
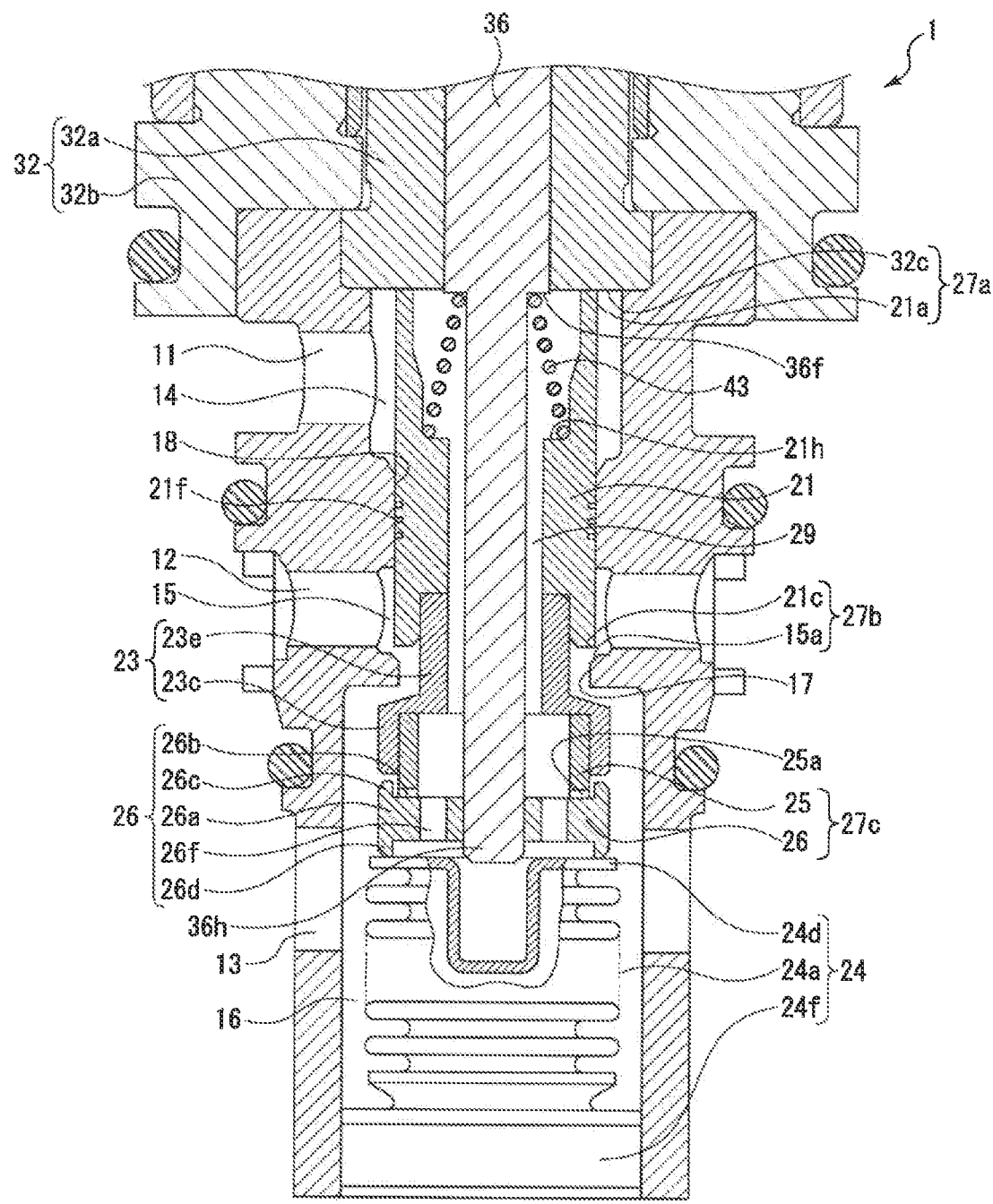
FIG. 2 is an enlarged view of part of a valve main body, a valve element, and a solenoid of FIG. 1 showing the capacity control valve at the time of turning off the solenoid.

Hereinafter, with reference to FIGS. 1 and 2, respective constituent elements of the capacity control valve 1 will be described. The valve main body 10 is made of metal such as brass, iron, aluminum, stainless, or synthetic resin, etc. The valve main body 10 is a cylindrical hollow member having a through hole which passes through in the axial direction. In sections of the through hole, a first valve chamber 14, a second valve chamber 15 adjacent to the first valve chamber 14, and a third valve chamber 16 adjacent to the second valve chamber 15 are continuously arranged.

A second communication passage 12 is continuously provided in the second valve chamber 15. This second communication passage 12 communicates with the inside of a discharge chamber (not shown) of a variable capacity compressor so that a fluid of discharge pressure Pd (second pressure according to the present invention) can flow in from the second valve chamber 15 to the third valve chamber 16 by opening and closing the capacity control valve 1.

A third communication passage 13 is continuously provided in the third valve chamber 16. The third communication passage 13 communicates with a control chamber (not shown) of the variable capacity compressor so that the fluid of discharge pressure Pd flowing in from the second valve chamber 15 to the third valve chamber 16 by opening and closing the capacity control valve 1 flows out to the control chamber (crank chamber) of the variable capacity compressor and a fluid of control chamber pressure Pc (third pressure according to the present invention) flowing into the third valve chamber 16 flows out to a suction chamber of the variable capacity compressor via an intermediate communication passage 29 to be described later and through the first valve chamber 14.

Further, a first communication passage 11 is continuously provided in the first valve chamber 14. This first communication passage 11 leads a fluid of suction pressure Ps (first pressure according to the present invention) from the suction chamber of the variable capacity compressor to the pressure-sensitive body 24 via the intermediate communication passage 29 to be described later, and controls the suction pressure of the compressor to a set value.

Between the first valve chamber 14 and the second valve chamber 15, a hole portion 18 having a diameter smaller than a diameter of any of these chambers is continuously formed. This hole portion 18 slides with a labyrinth 21f to be described later and forms a seal portion that seals a part between the first valve chamber 14 and the second valve chamber 15. Between the second valve chamber 15 and the third valve chamber 16, a valve hole 17 having a diameter smaller than a diameter of any of these chambers is continuously provided. A main valve seat 15a is formed around the valve hole 17 on the second valve chamber 15 side. This main valve seat 15a is separated from and connected to a main valve portion 21c to be described later so as to control opening and closing of a Pd-Pc flow passage providing communication between the second communication passage 12 and the third communication passage 13.

The pressure-sensitive body 24 is arranged in the third valve chamber 16. One end portion of a metal bellows 24a of this pressure-sensitive body 24 is combined to a partition adjusting portion 24f in a sealed state. This bellows 24a is made of phosphor bronze, stainless, etc. and a spring constant of the bellows is designed to be a predetermined value. An internal space of the pressure-sensitive body 24 is vacuum or the air exists in the internal space. Pressure acts on a valid pressure receiving area of the bellows 24a of this pressure-sensitive body 24 so that the pressure-sensitive body 24 is extended and contracted. A flange portion 24d is arranged on the free end portion side of the pressure-sensitive body 24. By directly pressing this flange portion 24d by a pressing portion 26 of a rod 36 to be described later, the pressure-sensitive body 24 is extended and contracted. That is, as described later, the pressure-sensitive body 24 is extended and contracted in accordance with the suction pressure Ps led to the pressure-sensitive body 24 via the intermediate communication passage 29, and also extended and contracted by pressing force of the rod 36.

The partition adjusting portion 24f of the pressure-sensitive body 24 is sealed, fitted, and fixed so as to close the third valve chamber 16 of the valve main body 10. By screwing the partition adjusting portion 24f and fixing by a locking screw (not shown), it is possible to adjust axial movement of spring force of a compression spring arranged in parallel in the bellows 24a or the bellows 24a.

For example, two to six parts of each of the first communication passage 11, the second communication passage 12, and the third communication passage 13 pass through a peripheral surface of the valve main body 10 at equal intervals. Further, attachment grooves for O rings are provided at three points while being separated in the axial direction on an outer peripheral surface of the valve main body 10. O rings 47, 48, 49 that seal a part between the valve main body 10 and an installment hole of a casing (not shown) fitted to the valve main body 10 are attached to the attachment grooves. Flow passages of the first communication passage 11, the second communication passage 12, and the third communication passage 13 are formed as independent flow passages.

Next, the valve element 20 will be described. The valve element 20 is mainly formed by a main valve element 21 which is a cylindrical hollow member, and an adapter 23. First, the main valve element 21 will be described. The main valve element 21 is a cylindrical hollow member, and the labyrinth 21f is formed in a substantially center portion in the axial direction of an outer peripheral portion of the main valve element. The main valve element 21 is inserted into the valve main body 10, and the labyrinth 21f slides on the hole portion 18 between the first valve chamber 14 side and the second valve chamber 15 side so as to form a seal portion that seals the first valve chamber 14 and the second valve chamber 15. Thereby, the first valve chamber 14 communicating with the first communication passage 11 and the second valve chamber 15 communicating with the second communication passage 12 are formed as independent valve chambers.

The main valve element 21 is arranged on the first communication passage 11 side and on the second communication passage 12 side across the labyrinth 21f. The main valve portion 21c is formed in an end portion of the main valve element 21 arranged on the second communication passage 12 side. The main valve portion 21c is separated from and connected to the main valve seat 15a so as to control opening and closing of the valve hole 17 providing communication between the second communication passage 12 and the third communication passage 13. The main valve portion 21c and the main valve seat 15a form a main valve 27b. A situation where the main valve portion 21c and the main valve seat 15a are brought from a contact state into a separate state will be indicated as the main valve 27b is opened or the main valve portion 21c is opened. A situation where the main valve portion 21c and the main valve seat 15a are brought from a separate state into a contact state will be indicated as the main valve 27b is closed or the main valve portion 21c is closed. A shut-off valve portion 21a is formed in an end portion of the main valve element 21 arranged in the first valve chamber 14. When the solenoid 30 to be described later is turned off, the shut-off valve portion 21a is brought into contact with an end portion 32c of a core 32 so as to shut off communication between the intermediate communication passage 29 and the first communication passage 11. The shut-off valve portion 21a and the end portion 32c of the core 32 form a shut-off valve 27a. The shut-off valve portion 21a and the main valve portion 21c of the valve element 20 perform opening and closing actions in the opposite directions to each other. A situation where the shut-off valve portion 21a and the end portion 32c of the core 32 are brought from a contact state into a separate state will be indicated as the shut-off valve 27a is opened or the shut-off valve portion 21a is opened. A situation where the shut-off valve portion 21a and the end portion 32c of the core 32 are brought from a separate state into a contact state will be indicated as the shut-off valve 27a is closed or the shut-off valve portion 21a is closed.

Next, the adapter 23 forming the valve element 20 will be described. The adapter 23 is mainly formed by a large diameter portion 23c formed to have a large diameter by a cylindrical hollow member, and a tube portion 23e formed to have a diameter smaller than the large diameter portion 23c. The tube portion 23e is fitted to an opening end portion on the main valve portion 21c side of the main valve element 21 so that the valve element 20 is formed. Thereby, the intermediate communication passage 29 passing through in the axial direction is formed in the inside of the main valve element 21 and the adapter 23, that is, the inside of the valve element 20.

The adapter 23 includes a spacer 25 (restrictor portion according to the present invention). The spacer 25 is a cylindrical member and has a groove shaped communication passage 25a passing through the spacer 25 in the radial direction at an end of the spacer. An opening area of the communication passage 25a is the smallest in the intermediate communication passage 29. In a state where an end portion of the spacer 25 on the communication passage 25a side is in contact with an end surface 26b of the pressing portion 26, a predetermined clearance is formed between the adapter 23 and the pressing portion 26. The opening area of the communication passage 25a is smaller than an area of the clearance between the adapter 23 and the pressing portion 26. Thus, by adjusting the opening area of the communication passage 25a serving as a bottleneck of the intermediate communication passage 29, it is possible to adjust the minimum amount of the coolant flowing through the intermediate communication passage 29. The spacer 25 and the pressing portion 26 form a restrictor mechanism 27c that adjusts an opening degree of the intermediate communication passage 29. The restrictor mechanism 27c is a variable restrictor mechanism in which the communication passage 25a has the minimum opening area and an opening area is changed in accordance with the area of the clearance between the spacer 25 and the pressing portion 26. The spacer 25 may be integrated with the adapter 23 or the spacer 25 may be fitted and fixed to the adapter 23.

Next, the solenoid 30 will be described. The solenoid 30 mainly includes the rod 36, a plunger case 38, an electromagnetic coil 31, the core 32 formed by a center post 32a and a base member 32b, a plunger 35, a plate 34, and a solenoid case 33. The rod 36 is driven in accordance with electric currents supplied from the outside. The plunger case 38 is a bottomed cylindrical hollow member whose one side is open. The plunger 35 is arranged movably in the axial direction with respect to the plunger case 38 between the plunger case 38 and the center post 32a arranged inside the plunger case 38. The core 32 is fitted to the valve main body 10 and arranged between the plunger 35 and the valve main body 10.

An opening end portion of the plunger case 38 is fixed to an inner peripheral portion of the base member 32b of the core 32 in a sealed state, and the solenoid case 33 is fixed to an outer peripheral portion of the base member 32b in a sealed state. The electromagnetic coil 31 is arranged in a space surrounded by the plunger case 38, the base member 32b of the core 32, and the solenoid case 33 and not brought into contact with a coolant. Thus, it is possible to prevent a decrease in insulation resistance.

The rod 36 is an axial member arranged in a state where the rod has a clearance from a through hole 32e of the center post 32a of the core 32 so as to be relatively moved with respect to the core 32. One end portion 36e of the rod 36 is fixed to the plunger 35, and the pressing portion 26 is fitted and fixed to the other end portion 36h of the rod 36.

The pressing portion 26 forming part of the rod 36 will be described. The pressing portion 26 is a disc plate shaped member in which a base portion 26a is formed and brim portions are formed from the base portion 26a on both sides in the axial direction. One brim portion 26c opposes the large diameter portion 23c of the adapter 23 in a state where the brim portion has a predetermined clearance, and the other brim portion 26d presses the flange portion 24d of the pressure-sensitive body 24 so as to extend and contract the pressure-sensitive body 24. A distribution hole 26f through which the coolant is distributed is formed in the base portion 26a of the pressing portion 26. The pressing portion 26 may be integrated with the rod 36 or the pressing portion 26 may be fitted and fixed to the rod 36 and integrally formed.

Between the core 32 and the plunger 35, a spring 37 (second biasing member according to the present invention) that biases the plunger 35 in the direction in which the plunger is separated from the core 32 is arranged.

The spring 37 is arranged between the plunger 35 and the core 32. Specifically, one end of the spring 37 is in contact with an end portion of the center post 32a, the other end is in contact with an end portion of the plunger 35, and the core 32 and the plunger 35 are biased in the direction in which the core and the plunger are separated from each other.

Next, a spring 43 (first biasing member according to the present invention) that biases the valve element 20 in the valve closing direction of the main valve portion 21c will be described. The spring 43 formed in a circular truncated cone is arranged between the solenoid 30 and the valve element 20. Specifically, one end of the spring 43 is in contact with a stepped portion 36f of the rod 36 formed at the substantially same position as the end portion 32c of the core 32, and the other end is in contact with an inside stepped portion 21h formed on the intermediate communication passage 29 side of the main valve element 21. The spring 43 is assembled between the main valve element 21 and the rod 36 in a state where the spring is compressed by a predetermined amount from natural length, that is, in a state where the spring has an initial set load. Thereby, the spring 43 is not deformed with drive force of the solenoid 30 being not more than the initial set load, and the valve element 20 and the rod 36 are integrally moved in a state where relative positions are maintained. The spring 43 is deformed upon exceeding the initial set load, and the rod 36 is relatively moved with respect to the valve element 20. The initial set load of the spring 43 is set to be larger than the drive force of the solenoid 30 at the time of controlling the capacity control valve 1.

Actions of the capacity control valve 1 having the configuration described above will be described. A flow passage running from the third communication passage 13 to the first communication passage 11 through the intermediate communication passage 29 will be called as the "Pc-Ps flow passage" below. A flow passage running from the second communication passage 12 to the third communication passage 13 through the valve hole 17 will be called as the "Pd-Pc flow passage" below.

First, movement of the rod 36 and movement of the valve portions of the valve element 20 will be described. First of all, based on FIGS. 1 and 2, the movement of the rod 36 and the movement of the valve portions of the valve element 20 in a non-energized state of the solenoid 30 will be described. In a non-energized state, the plunger 35 is pushed upward by biasing force of the pressure-sensitive body 24 and biasing force of the spring 37 (FIG. 1), the main valve portion 21c of the valve element 20 is fully opened, and the shut-off valve portion 21a is fully closed. The restrictor mechanism 27c is brought into the minimum restriction state by the communication passage 25a of the spacer 25.

Figure 3:
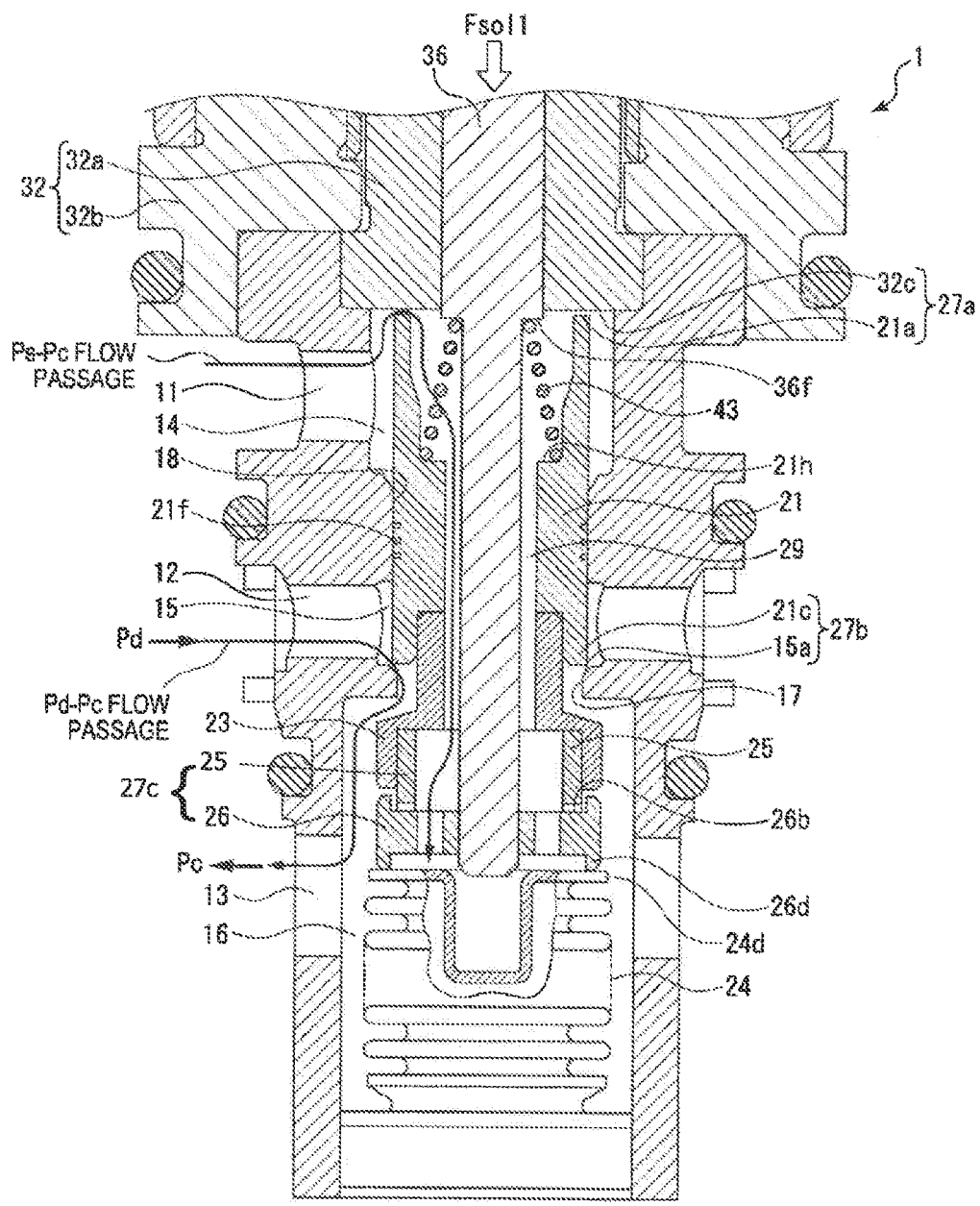
FIG. 3 is an enlarged view of part of the valve main body, the valve element, and the solenoid of FIG. 1 showing a control state of the capacity control valve.

Next, based on FIG. 3, the movement of the rod 36 and the movement of the valve portions of the valve element 20 in a state where energization of the solenoid 30 is started from a non-energized state and the main valve 27b is opened will be described. Since the initial set load of the spring 43 is set to be larger than the drive force of the solenoid 30 at the time of controlling the capacity control valve 1, in a state where the main valve 27b is opened, the spring 43 is not deformed and the rod 36 and the valve element 20 are integrally moved. First, when energization of the solenoid 30 is started from a non-energized state, the valve element 20 and the rod 36 are integrally and gradually driven in the forward direction (direction in which the rod 36 pops out from the end portion 32c of the core 32 to the outside). Thereby, the shut-off valve portion 21a is separated from the end portion 32c of the core 32, the shut-off valve 27a is opened from a fully closed state, and the main valve 27b is gradually narrowed down from a fully opened state. At the time of controlling the capacity control valve 1, the valve element 20 and the rod 36 are integrally displaced. Thus, the capacity control valve 1 can stably control an opening degree of the main valve 27b.

Figure 4:
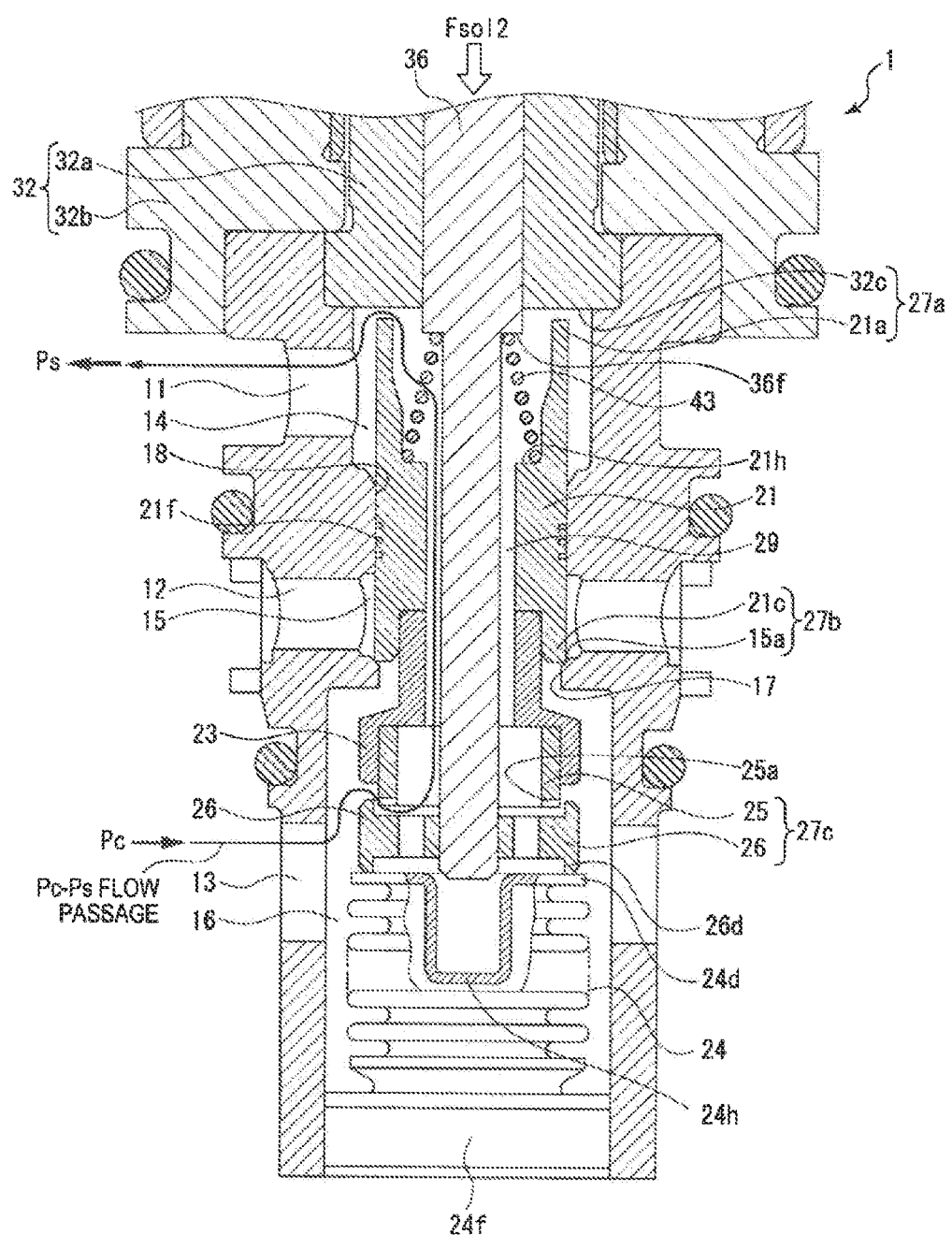
FIG. 4 is an enlarged view of part of the valve main body, the valve element, and the solenoid of FIG. 1 showing a state of the capacity control valve at the time of liquid coolant discharge.
Figure 5:
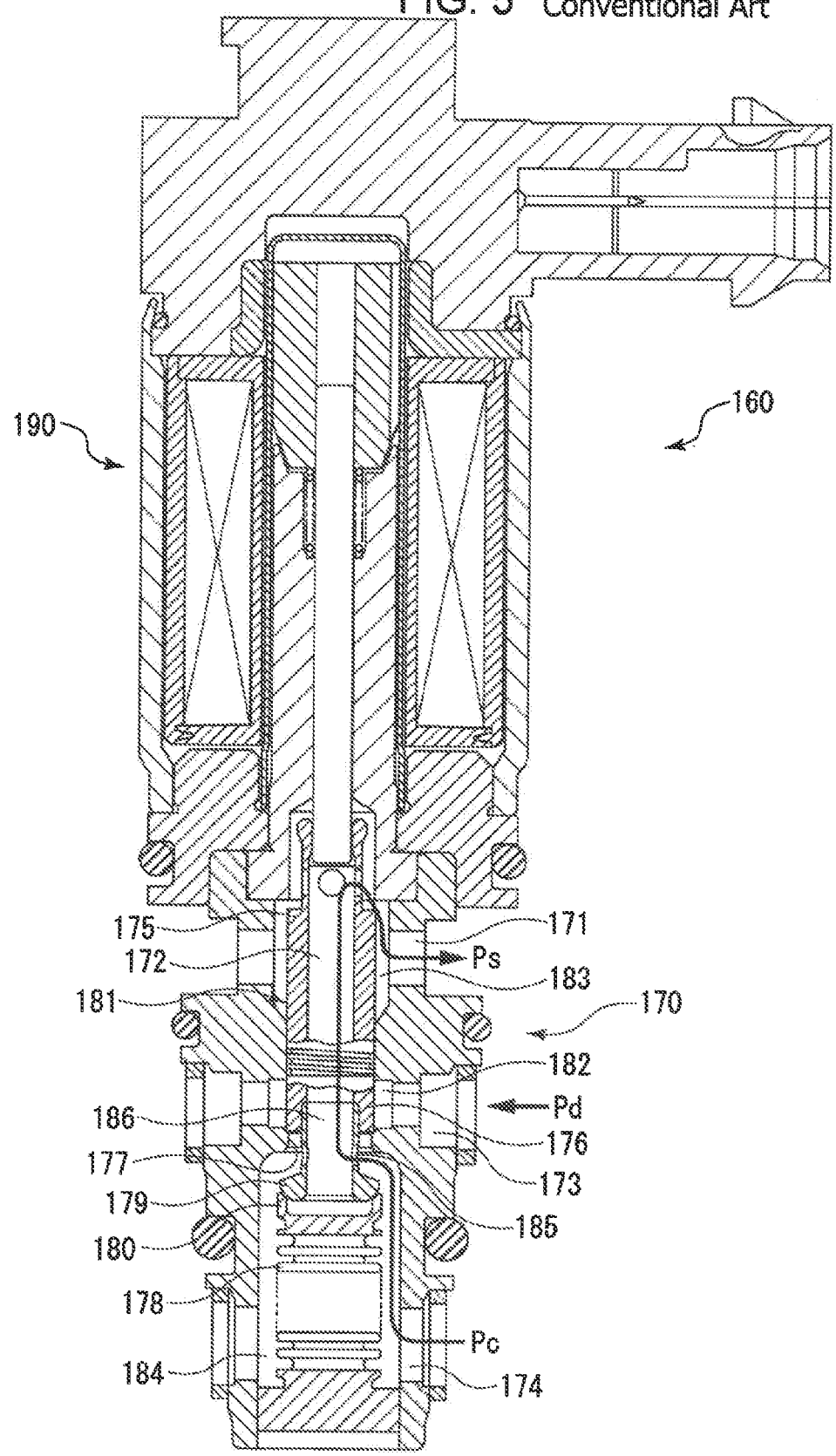
FIG. 5 is a front sectional view showing a conventional capacity control valve.
Figure 6:
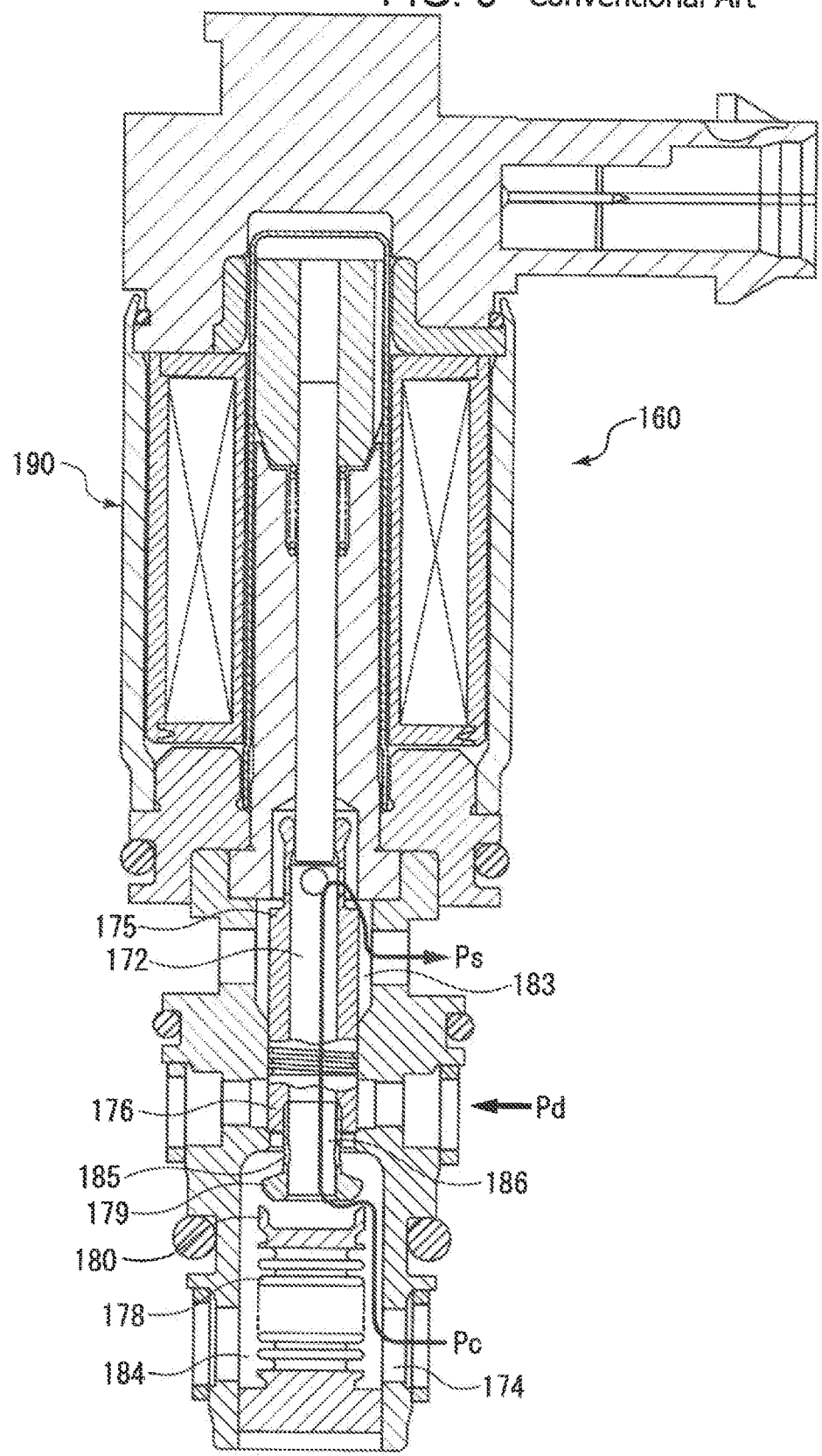
FIG. 6 shows a state of the conventional capacity control valve at the time of liquid coolant discharge.

Further, when the rod 36 is driven in the forward direction, as shown in FIG. 4, the shut-off valve 27a is brought into a fully opened state, the main valve portion 21c is brought into contact with the main valve seat 15a, the main valve 27b is brought into a fully closed state, and the movement of the valve element 20 is stopped. When the solenoid 30 is further driven in a state where the valve element 20 is stopped, the drive force of the solenoid 30 exceeds the initial set load of the spring 43, the spring 43 is deformed, and relative movement of the rod 36 with respect to the valve element 20 is started. Thus, the pressing portion 26 of the rod 36 is separated from the spacer 25 and an opening degree of the restrictor mechanism 27c is increased. When the rod 36 is further driven, the spring 43 is deformed, the brim portion 26d of the pressing portion 26 presses the flange portion 24d of the pressure-sensitive body 24, and the pressure-sensitive body 24 is contracted, so that it is possible to bring the restrictor mechanism 27c into a fully opened state. When the pressure-sensitive body 24 is contracted by a predetermined amount, a projected portion 24h of the flange portion 24d and a projected portion (not shown) provided in the partition adjusting portion 24f are brought into contact with each other, deformation of the pressure-sensitive body 24 is stopped, and the movement of the rod 36 is also stopped.

The movement of the rod 36 and the movement of the valve portions of the valve element 20 are described above. Next, actions of the capacity control valve 1 and the variable capacity compressor will be described based on FIG. 3. First, a control state of the capacity control valve 1 will be described. The control state is a state where the opening degree of the main valve 27b is set to an opening degree determined in advance, and the pressure of the suction chamber of the variable capacity compressor is controlled to be a set value Pset. In this state, the suction pressure Ps of the suction chamber of the variable capacity compressor passes through the intermediate communication passage 29, flows to an internal space surrounded by the pressing portion 26 of the rod 36 and the flange portion 24d of the pressure-sensitive body 24, and acts on the pressure-sensitive body 24. As a result, the main valve portion 21c is stopped at a position where force in the valve opening direction of the spring 37, force by the solenoid 30, and force by the pressure-sensitive body 24 to be extended and contracted in accordance with the pressure Ps of the suction chamber are balanced, and the pressure of the suction chamber of the variable capacity compressor is controlled to be the set value Pset. However, there is sometimes a case where the pressure Ps of the suction chamber is varied with respect to the set value Pset. For example, when the pressure Ps of the suction chamber is increased to be more than the set value Pset due to disturbance, etc., the pressure-sensitive body 24 is contracted and the opening degree of the main valve 27b is decreased. Thereby, since the Pd-Pc flow passage is narrowed down, a coolant amount of the discharge pressure Pd flowing in from the discharge chamber to the crank chamber is reduced and pressure of the crank chamber is lowered. As a result, a tilting angle of a swash plate of the compressor is increased, a discharge capacity of the compressor is increased, and discharge pressure is lowered. On the contrary, when the pressure Ps of the suction chamber is decreased to be lower than the set value Pset, the pressure-sensitive body 24 is extended and the opening degree of the main valve 27b is increased. Thereby, since the Pd-Pc flow passage is increased, the coolant amount of the discharge pressure Pd flowing in from the discharge chamber to the crank chamber is increased and the pressure of the crank chamber is increased. As a result, the tilting angle of the swash plate of the compressor is decreased, the discharge capacity of the compressor is reduced, and the discharge pressure is increased. In this way, by the capacity control valve 1, it is possible to control the pressure of the suction chamber of the variable capacity compressor to be the set value Pset.

However, even when the opening degree of the main valve 27b is controlled as described above, the pressure of the control chamber (crank chamber) of the variable capacity compressor is gradually increased by a blow-by gas flowing through a tiny clearance between a piston and a cylinder bore, and there is sometimes a case where the set pressure and the set discharge amount cannot be stably maintained. Therefore, as shown in FIG. 4, by letting the coolant of the control chamber pass through the communication passage 25a of the spacer 25 from the third communication passage 13 and flow to the first communication passage and the suction chamber via the intermediate communication passage 29, it is possible to stabilize the pressure of the control chamber (crank chamber) of the variable capacity compressor, and hence it is possible to improve stability of the capacity control valve 1.

Next, a liquid coolant discharge state of the capacity control valve 1 will be described based on FIG. 4. After the compressor is stopped for a long time, a liquid coolant (made by cooling and liquefying a coolant during abandonment) is accumulated in the crank chamber. Thus, in order to ensure predetermined discharge pressure and a predetermined discharge flow rate after start-up of the compressor, there is a need for discharging the liquid coolant as soon as possible. At the time of liquid coolant discharge, pressure of the third valve chamber 16 communicating with the crank chamber and the suction pressure Ps are high pressure, the pressure-sensitive body 24 is contracted, the solenoid 30 is driven in the forward direction, the pressure-sensitive body 24 is pressed by the pressing portion 26 of the rod 36, and the restrictor mechanism 27c is forcibly brought into a fully opened state. Thereby, the opening degree of the restrictor mechanism 27c is not changed from start of the liquid coolant discharge to completion of the liquid coolant discharge, and it is possible to discharge the liquid coolant from the crank chamber to the suction chamber via the Pc-Ps flow passage for a short time.

In this way, by the restrictor mechanism 27c, the control chamber and the suction chamber of the variable capacity compressor communicate with each other via the restrictor mechanism 27c and the intermediate communication passage 29. Thus, it is possible to suppress the pressure of the control chamber from being increased by the blow-by gas so as to stabilize the pressure of the control chamber. Thus, it is possible to improve control stability of the capacity control valve 1. At the time of the liquid coolant discharge of the capacity control valve 1, the rod 36 is relatively moved with respect to the valve element 20, and it is possible to forcibly separate the pressing portion 26 of the rod 36 from the spacer 25 of the restrictor mechanism 27c. Thereby, at the time of the liquid coolant discharge, it is possible to maintain the opening degree of the restrictor mechanism 27c in a fully opened state irrespective of the pressure of the third valve chamber 16 communicating with the crank chamber and the suction pressure Ps. Thus, it is possible to discharge the liquid coolant from the crank chamber to the suction chamber via the Pc-Ps flow passage for a short time.

The embodiment of the present invention is described with the drawings above. Specific configurations are not limited to the embodiment but the present invention also includes changes and additions within the range not departing from the gist of the present invention.

In the above embodiment, the first pressure of the first valve chamber 14 is the suction pressure Ps of the variable capacity compressor, the second pressure of the second valve chamber 15 is the discharge pressure Pd of the variable capacity compressor, and the third pressure of the third valve chamber 16 is the pressure Pc of the crank chamber of the variable capacity compressor. However, the present invention is not limited to this but with the first pressure of the first valve chamber 14 being the pressure Pc of the crank chamber of the variable capacity compressor, the second pressure of the second valve chamber 15 being the discharge pressure Pd of the variable capacity compressor, and the third pressure of the third valve chamber 16 being the suction pressure Ps of the variable capacity compressor, it is possible to respond to various variable capacity compressors.

REFERENCE SIGNS LIST 1 capacity control valve
10 valve main body
11 first communication passage
12 second communication passage
13 third communication passage
14 first valve chamber
15 second valve chamber
15a main valve seat
16 third valve chamber
17 valve hole
20 valve element
21 main valve element
21a shut-off valve portion
21c main valve portion
23 adaptor
24 pressure-sensitive body
24a bellows
24d flange portion
25 spacer (restrictor portion)
25a communication passage
26 pressing portion
26c brim portion
26d brim portion
27a shut-off valve
27b main valve
27c restrictor mechanism
29 intermediate communication passage
30 solenoid portion
31 electromagnetic coil
32 core
35 plunger
36 rod
37 spring (second biasing member)
43 spring (first biasing member)
Fsol magnetic attracting force
Ps suction pressure (first pressure) (third pressure)
Pd discharge pressure
Pc control chamber pressure (third pressure) (first pressure)
Pset suction pressure set value

The invention claimed is:

1. A capacity control valve that controls a flow rate or pressure of a variable capacity compressor in accordance with a valve opening degree of a valve portion, the capacity control valve being characterized by comprising:

a valve main body having a first communication passage through which a fluid of first pressure passes, a second communication passage arranged adjacent to the first communication passage, the second communication passage through which a fluid of second pressure passes, a third communication passage through which a fluid of third pressure passes, and a main valve seat arranged in a valve hole which provides communication between the second communication passage and the third communication passage, wherein the first pressure is suction pressure of the variable capacity compressor, the second pressure is discharge pressure of the variable capacity compressor, and the third pressure is a pressure of a crank chamber of the variable capacity compressor;

a pressure-sensitive body arranged in the valve main body on the third communication passage side, wherein the pressure-sensitive body has a bellows and a flange at one end of the bellows, another end of the bellows is fixed to a partition that defines a valve chamber with the valve main body, and the pressure sensitive body expands and contracts according to the suction pressure which is transmitted to the pressure-sensitive body via an intermediate communication passage providing communication between the first communication passage and the third communication passage;

a solenoid that drives a rod having a pressing portion that presses the pressure-sensitive body, wherein the pressing portion has a brim portion on a first side in an axial direction facing the flange of the pressure-sensitive body and an end surface on a second side opposite to the first side in the axial direction;

a valve element having a first portion of the intermediate communication passage, a main valve portion to be separated from and connected to the main valve seat so as to open and close the valve hole, and a restrictor portion having a second portion of the intermediate communication passage; the restrictor portion opposing the pressing portion and having a minimum communication passage penetrating through a wall of the restrictor portion, wherein an opening area of the minimum communication passage is a smallest opening area in the intermediate communication passage; and a first spring that biases the valve element in the valve closing direction of the main valve portion, wherein the brim portion of the pressing portion presses on the flange of the pressure sensitive body, and the pressing portion and the restrictor portion constitute a restrictor mechanism; wherein the restrictor mechanism adjusts an opening degree of the intermediate communication passage between the end surface of the pressing portion and the restrictor portion, wherein the restrictor mechanism is a variable restrictor mechanism in which the opening degree of the intermediate communication passage is changed in accordance with an area of a clearance between the restrictor portion having the minimum communication passage and the end surface of the pressing portion, and the rod is relatively moved with respect to the valve element so as to control an amount of separation between the pressing portion and the restrictor portion of the restrictor mechanism.

2. The capacity control valve according to claim 1, characterized in that the solenoid further includes a plunger connected to the rod, a core arranged between the plunger and the valve main body, an electromagnetic coil, and a second spring arranged between the plunger and the core.

3. The capacity control valve according to claim 1, characterized in that the first spring is arranged between the rod and the valve element.

4. The capacity control valve according to claim 3, characterized in that the solenoid further includes a plunger connected to the rod, a core arranged between the plunger and the valve main body, an electromagnetic coil, and a second spring arranged between the plunger and the core.

* * * * *